United States Patent [19]

Rosenow et al.

[11] Patent Number: 5,483,596
[45] Date of Patent: Jan. 9, 1996

[54] APPARATUS AND METHOD FOR CONTROLLING ACCESS TO AND INTERCONNECTION OF COMPUTER SYSTEM RESOURCES

[75] Inventors: Peter D. Rosenow, Edmonds; Roger M. Trafton, Kirkland, both of Wash.

[73] Assignee: Paralon Technologies, Inc., Bellevue, Wash.

[21] Appl. No.: 186,663

[22] Filed: Jan. 24, 1994

[51] Int. Cl.[6] .............................. H04L 9/00; H04L 9/32
[52] U.S. Cl. .................... 380/25; 380/4; 380/9; 380/21; 380/23; 380/49; 380/50
[58] Field of Search ................. 380/4, 9, 10, 20, 380/21, 23, 24, 25, 28, 44, 46, 49, 50

[56] References Cited

U.S. PATENT DOCUMENTS

| | | | |
|---|---|---|---|
| 4,546,213 | 10/1985 | Dick | 379/95 |
| 4,679,226 | 7/1987 | Muehleisen | 379/95 |
| 4,905,281 | 2/1990 | Surjaatmadja et al. | 380/25 |
| 4,956,769 | 9/1990 | Smith | 380/25 X |
| 4,995,112 | 2/1991 | Aoyama | 380/25 |
| 5,003,595 | 3/1991 | Collins et al. | 380/25 |
| 5,018,190 | 5/1991 | Walker et al. | 379/95 |
| 5,131,025 | 7/1992 | Hamasaki | 379/95 |
| 5,153,918 | 10/1992 | Tuai | 380/25 |
| 5,173,939 | 12/1992 | Abadi et al. | 380/25 |
| 5,204,961 | 4/1993 | Barlow | 380/25 X |
| 5,253,295 | 10/1993 | Saada et al. | 380/23 |
| 5,297,207 | 3/1994 | Degele | 380/46 |
| 5,297,208 | 3/1994 | Schlafly et al. | 380/49 |
| 5,315,657 | 5/1994 | Abadi et al. | 380/25 |

OTHER PUBLICATIONS

"Network World: Network Security Secrets," David J. Stang and Sylvia Moon, IDG Books Worldwide, Inc., San Mateo, California, 1993, pp. 437–459.

Primary Examiner—Bernarr E. Gregory
Attorney, Agent, or Firm—Stoel Rives

[57] ABSTRACT

A compact, physically secure, high-performance access controller (16, 18) is electrically connected to each access-managed resource (12, 14) or group of resources (10) in a computer system. Whenever access managed resources attempt to establish communications, their associated access controllers exchange sets of internally generated access authorization codes (106, 112, 120, 132, 202, 208, 216, 270, 272) utilizing protocols characterized by multiple random numbers, resource authorization keys, serial number (48, 72) verification, and session authorization keys. Each new session employs different encryption keys derived from multiple random numbers and multiple hidden algorithms. Tables of authorized requesting and responding resources are maintained in a protected memory (34, 38) in each access controller. An authorization table building procedure is augmented by an optional central access control system (56) that employs a parallel control network (62, 64, 66) to centrally manage the access control tables in an access-controlled system of resources.

33 Claims, 8 Drawing Sheets

APPARATUS AND METHOD FOR CONTROLLING ACCESS TO AND INTERCONNECTION OF COMPUTER SYSTEM RESOURCES

TECHNICAL FIELD

This invention relates to securing access to and data communication among computer system resources and, more particularly, to an apparatus and a method for managing and securing user resource access, user application access, and system resource configuration in electronic systems employing a potentially diverse mix of interconnected system resources.

BACKGROUND OF THE INVENTION

There are previously known measures for implementing computer security measures intended to prevent "hackers," disgruntled employees, industrial "spys," irregular security maintenance, and the like from obtaining unauthorized access to or compromising data transferred among computer system resources. It is well known that conventional computer "login" procedures that require entering a user name followed by a password do not provide a high level of security. Such login procedures and passwords are susceptible to disgruntled employees, easily broken, infrequently changed, and easily determined by recording data communications transferred on any signal carrier or telephone line. Never the less, user names and passwords remain the most commonly used type of computer security measure.

A slightly higher security level can be achieved by preventing access to a computer until an additional access code is received. U.S. Pat. No. 4,546,213 issued Oct. 8, 1985 for a MODEM SECURITY DEVICE describes a circuit that conceals a responding modem from a requesting device until an up to 10-digit touch-tone "DTMF" code is entered at the requesting device and is correctly decoded by the circuit. If the correct code is received, the requesting device is connected to the modem and the usual login procedure is followed. However, if a predetermined number of incorrect digits is received, the circuit prevents repeated login attempts by disabling the modem from all communications for a predetermined time period. Unfortunately, DTMF codes are easily determined by monitoring the telephone line, and the system is susceptible to all the problems associated with conventional login procedures.

U.S. Pat. No. 5,131,025 issued Jul. 14, 1992 for an INTELLIGENT MODEM SYSTEM WHICH DETERMINES PROPER ACCESS THERETO describes a login verification system in which the modem searches an authorized users list for a match with an identification code sent by a requesting caller. If a match is found, the modem connects the requesting caller to an associated computer, and the usual login procedure is followed. This system is susceptible to unauthorized use for all the above-described reasons. In addition, once an unauthorized user accesses the modem, the user can add identification codes to the called modem and any other modem identified in the authorized users list. There is no control over the assignment of identification codes, duplicate code prevention, or users that can establish codes.

The above-described problems caused prior workers to devise login procedures intended to mislead, confuse, and otherwise hide the computer from unauthorized users. For example, U.S. Pat. No. 4,905,281 issued Feb. 27, 1990 for a SECURITY APPARATUS AND METHOD FOR COMPUTERS CONNECTED TO TELEPHONE CIRCUITS describes a system in which a security controller is interposed between two modems wherein the first modem is connected to the telephone line and the second modem is connected to a computer. When the first modem receives a call, the caller is connected to the controller and hears either silence or a misleading voice response. If the caller then sends the proper response, the controller connects the first modem to the second modem and the usual login procedure is followed. However, unauthorized users can determine the required codes by monitoring the telephone line, and, as before, the system is not immune to disgruntled employees or poor security maintenance procedures.

An improved method for concealing a login procedure is described in U.S. Pat. No. 4,679,226 issued Jul. 7, 1987 for a COMPUTER SECURITY GUARD CIRCUIT in which a first modem connects a caller to the conventional login procedure of a computer. However, a security guard circuit disconnects the first modem from the computer unless the caller also calls the security guard circuit on a second telephone line within a predetermined time period. This system prevents unauthorized users from determining the complete login procedure by monitoring a single telephone line. However, the system is still not immune to disgruntled employees or poor security maintenance procedures.

Many computer-based applications, such as those found in banks, security houses, governments, and the military, require much higher data security levels. Therefore, a computer callback login procedure was developed in which a caller first follows a conventional login procedure with a computer and then immediately hangs up the phone. The computer then calls the user at a phone number stored in an authorized users list to establish an authorized connection. However, as for prior systems, this system is susceptible to disgruntled employees and poor security maintenance. In addition, the callback to an authorized phone number can be defeated by "hacking" the telephone switch computer and call-forwarding the callback phone number to an unauthorized phone number.

A modification of the callback procedure is described in U.S. Pat. No. 5,003,595 issued Mar. 26, 1991 for SECURE DIAL ACCESS TO COMPUTER SYSTEMS in which the caller's telephone number is identified by an automatic phone number identifying system, such as "caller ID," and then compared with phone numbers in an authorized caller list. This system allows calls only from authorized locations unless, of course, the caller ID system is susceptible to hacking. The system is also susceptible to the usual disgruntled employee and security maintenance problems, and monitoring the telephone line can provide access to an unauthorized user at an authorized phone number.

To circumvent many of the above-described computer security problems, prior workers have devised login procedures that further require the use of user-identifying devices such as magnetic card readers, speech recognizers, eye scanners, and encoded transponders. One such system is described in U.S. Pat. No. 5,153,918 issued Oct. 6, 1992 for a SECURITY SYSTEM FOR DATA COMMUNICATIONS in which access to a host computer is controlled by a central access controller that communicates via modems with transponders attached to each remote user terminal. A user attempting to access the host computer first calls the central access controller, which returns a random number across the telephone line to the user's transponder, which uses the random number to encrypt and decrypt all ensuing communications with the access controller. The user is prompted for a password that the transponder encrypts together with a unique transponder serial number. The encrypted password and serial number are sent to the access controller, which searches an authorization table for matches. If the password and serial number are both matched, the user is prompted to utter a code word into a speech digitizer unit and/or pass a card key through a magnetic card reader. The digitized speech is compressed, encoded, and transmitted to the access controller where its code pattern is verified against stored templates of authorized speech patterns, thereby providing an additional layer of security that is keyed to authorized users.

Even this system has potential security problems. For example, card keys and transponders can be stolen, lost, or not turned in by terminated employees who can then log in from any location until the authorization table is revised. Sending the random number used to establish an encryption key across a potentially monitored telephone line compromises the entire encryption process. Because all communications to the host computer must pass through the central access controller, such a system is not practical for use in widely scattered systems employing multiple host computers and/or diverse resources. Also, the complexity, expense, and unreliability associated with key devices such as voice recognizers, thumbprint readers, and eye scanners discourages their use.

Once logged into a system, a user (authorized or not) typically has unrestricted access to resources including networked servers, applications software, data bases, and user files. In some systems, certain resources have separately defined authorization levels that require users to follow a second login procedure. Users may also encrypt selected files under a user-defined encryption key. However, such multi-level security systems are easily broken or compromised by monitoring communications lines, sharing passwords and encryption keys among employees, poor security maintenance, and abuse by disgruntled employees.

Because authorized access to computer resources is so easily thwarted, data encryption methods ("cryptography") have evolved to prevent compromised data resources from being understood. Network World: Network Security secrets, David J. Stang and Sylvia Moon, 1993, IDG Books Worldwide, Inc., San Mateo, Calif., describes various practical data encryption systems and their relative strengths and weaknesses. Traditional cryptography is based on the sender and receiver of a message knowing and using the same secret key. The main problems with secret keys are generating them and keeping them secret. Of course, during World War II, the German "Enigma" and Japanese "Purple" secret key codes were broken without the use of computers, partly because of poor keys and partly because code books were captured. To solve the key generation and management problems, a public key cryptography system referred to as "RSA" (after its developers) was developed in 1977. Every user is issued or generates a pair of keys, one public and the other private. Every user publishes his public key and keeps the private key a personal secret. The need for senders and receivers to share keys is eliminated. All communications involve only the public keys that are openly transmitted. Clearly, it is a requirement that no one can deduce a private key from a corresponding public key. RSA is very secure. At its lowest level of security, today's fastest computers would require 10 years to break a single key. Unfortunately, RSA is so convoluted and complex that the fastest RSA encryption/decryption circuits can process only 64 kilobits of data per second.

Because encryption/decryption speed is often required, the Data Encryption Standard ("DES") was developed in 1977 by IBM. DES employs a 56-bit secret key system, processes data at a one megabyte per second rate, and is available on an inexpensive microchip. However, the National Security Agency can break DES keys in about one day, so many workers believe its 56-bit key is too short for many secure applications.

Skilled cryptography workers use a triangular (or three-legged stool) model to describe the three dominant factors of cryptography systems, degree of security, system cost, and ease of use. The conventional wisdom is that one of the three factors must be sacrificed to strengthen the other two.

Clearly a need exists for an improved means of establishing, monitoring, and maintaining computer resource data security, particularly in networks of widely distributed and diverse computing resources. Such a security management system should not sacrifice cost, the degree of security, or ease of use and should provide a solution to the key generation and management problem.

SUMMARY OF THE INVENTION

An object of this invention is, therefore, to provide an apparatus and a method for managing secure access to computer system resources that is transparent to the user, easy to use, does not require users to manage, generate, or even know any encryption keys, and is retrofittable into existing systems.

Another object is to provide an apparatus and a method for managing secure access to computer system resources that is low in cost, highly secure, easy to use, and employs techniques that prevent unauthorized users from breaking resource security by monitoring communications lines, hacking system resources, stealing security devices, reverse engineering, or sharing encryption keys.

A further object is to provide an apparatus and a method for managing secure access to computer system resources that verifies multiple levels of resource authorization before establishing a connection between requesting and responding resources.

Still another object is to provide an apparatus and a method for centrally managing secure access to widely distributed diverse computer system resources such as software, servers, computers, networks, data bases, communications switches, and related services such as controlling software distribution, licensing, and installation.

Accordingly, this invention provides a compact, physically secure, high-performance access controller that is electrically connected to each access-managed resource or group of resources in a computer system. Whenever access-managed resources attempt to establish communications, their associated access controllers exchange sets of internally generated DES encrypted access authorization codes utilizing protocols characterized by multiple random numbers, resource authorization keys, serial number verification, and session authorization keys. Each new session employs different encryption keys derived from multiple random numbers and multiple hidden algorithms. The access control management data exchanges are transparent to the user, and the keys employed are not transmitted across a communications line.

Tables of authorized requesting and responding resources are maintained in a protected memory in each access controller. A simple and automatic authorization table building procedure is augmented by an optional central access control system that employs a dedicated parallel control network, such as a LAN, to store, verify, update, erase, add, configure, restore, and otherwise centrally manage the access control tables of an access-controlled system of resources. All resources implementing the parallel control network are likewise access managed by access controllers. The access controllers are physically protected against theft and reverse engineering by a data self-destruct mechanism that erases the memory if physical tampering and/or removal of connectors is detected.

Additional objects and advantages of this invention will be apparent from the following detailed description of preferred embodiments thereof that proceed with reference to the accompanying drawings.

DETAILED DESCRIPTION OF PREFERRED EMBODIMENTS

Figure 1:
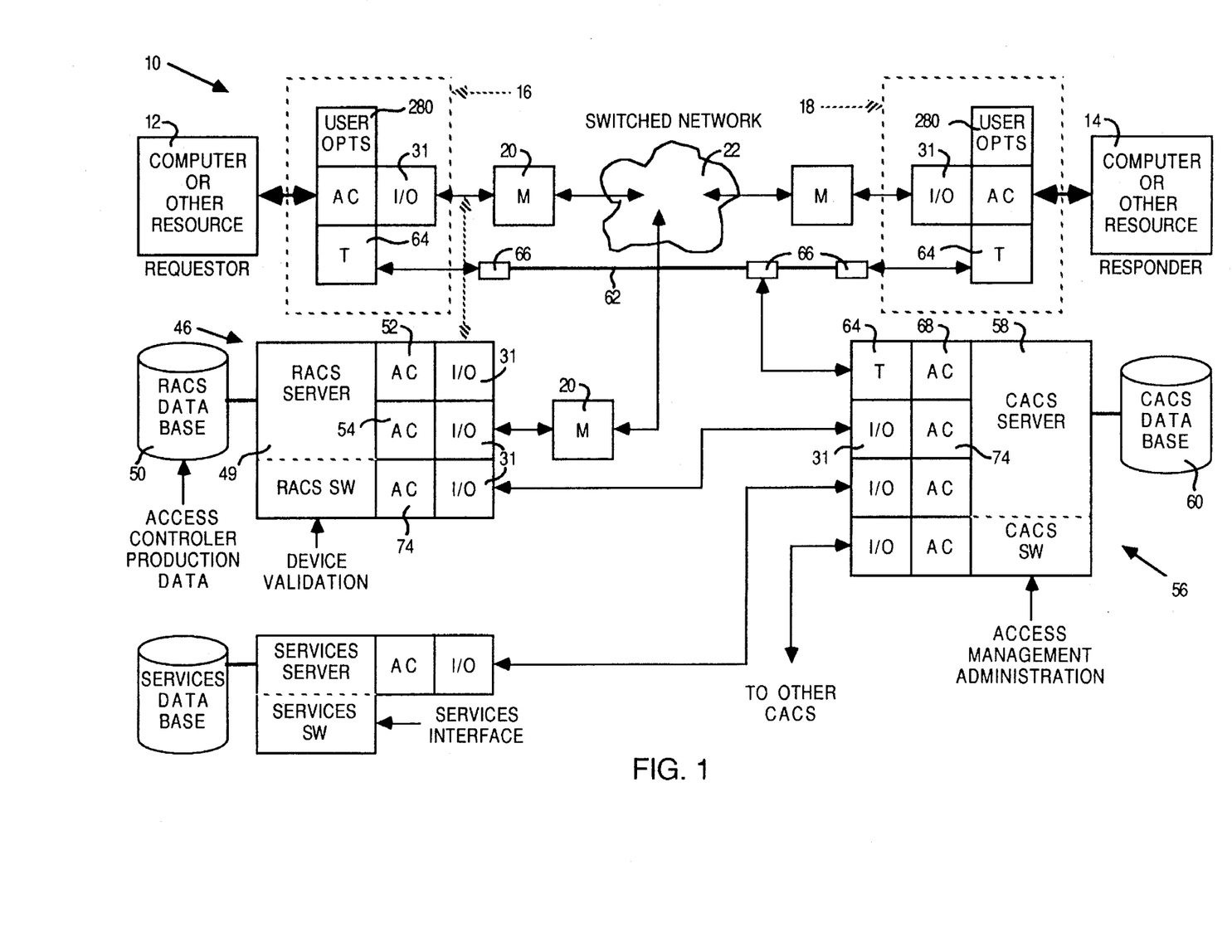
FIG. 1 is a simplified block diagram showing an arrangement of computer system resources in which resources and services are selectively interconnected through secure access controllers in a manner according to this invention.

FIG. 1 shows a computer system in which an access control system 10 allows a calling computer 12 ("requestor") to access a called computer 14 ("responder"). Access control system 10 includes substantially identical access controllers 16 and 18 and a conventional modem 20 associated with each of requestor 12 and responder 14. Modems 20 are selectively interconnected by a switched network 22, which together represent only one of many possible resource interconnection schemes manageable by this invention. Many separate instances of requestor 12 and responder 14 may be interconnected through access control system 10 of which personal computers are only a preferred form of resource.

When requestor 12 transmits a calling signal through modems 20 and switched network 22 to responder 14, access controller 18 intercepts the calling signal before it reaches responder 14. Access controller 18 causes associated modem 20 to turn on its carrier and waits for a response from modem 20 associated with access controller 16. Access controller 16 identifies itself by sending an access control code to access controller 18 along with a request for access controller 18 to identify itself. If access controller 18 determines that the access control code from access controller 16 is in a locally stored, authorized resource table, access controller 18 responds by transmitting its access control code to access controller 16. If access controller 16 determines that the access control code is in its locally stored authorized resource table, access controllers 16 and 18 connect requestor 12 and responder 14, thereby enabling modem data communications. However, if either of access controllers 16 or 18 determines that an access control code is not in their respective authorized resource tables, no communications are enabled between requestor 12 and responder 14. To ensure security, the access control codes are preferably generated, encrypted, and transmitted by processes described later with reference to FIGS. 2, 3, and 6.

Figure 2:
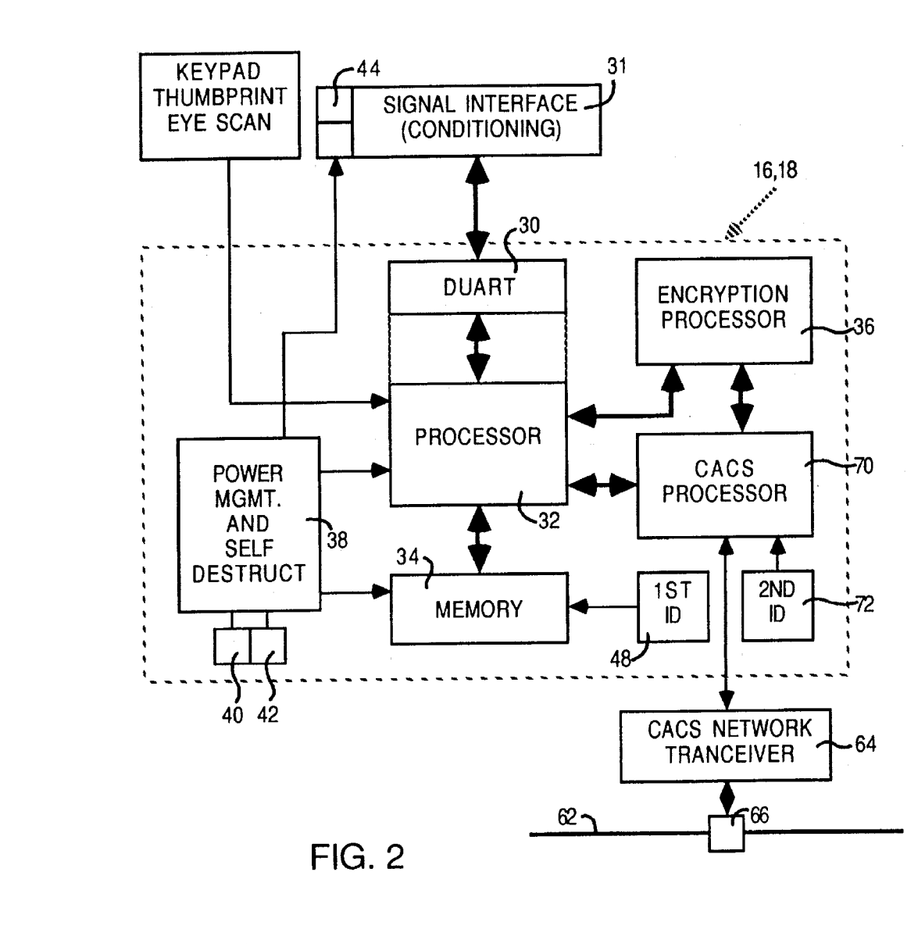
FIG. 2 is a block diagram showing a preferred embodiment of an access controller of this invention.

FIG. 2 shows an electrical block diagram of a representative access controller such as 16 or 18 that includes a conventional dual universal asynchronous receiver transmitter ("DUART") 30 that controls communications among requestor 12, responder 14, and associated modems 20. Bidirectional data transferred between DUART 30 and modem 20 is conditioned by a signal interface 31, which preferably converts between conventional logic signal levels and signal levels conforming to EIA standard RS-232C. DUART 30 is integrated with a processor 32 which is preferably a type H8/325 micro-controller manufactured by Hitachi Semiconductor, located in Tokyo, Japan.

Access controllers 16 and 18 further include a memory 34, such as RAM and EPROM, that stores the access control codes, dynamic variables, and application programs used by processor 32. An encryption processor 36 provides additional security by encrypting the access control codes before they are transmitted to another access controller. Encryption processor 36 employs the DES algorithm and is preferably a type CA20C03A manufactured by Newbridge Microsystems, Ontario, Canada. When access control code encryption is employed, all associated access controllers must employ a similar encryption processor to decipher the encrypted access control codes.

In an alternative embodiment, the access controllers may further include an integral modem.

This invention provides greater security than conventional DES encryption systems because of an improved encryption key management system that generates internal tables of unique secret keys that remain unknown even to the users of access controllers 16 and 18. Encryption processor 36 is inexpensive, has a high-performance one-megabyte-per-second operation rate, but employs the relatively insecure 56-bit DES encryption key. To overcome this weakness, access controllers 16 and 18 employ multiple and different random numbers, authorization keys, hidden algorithms, and unique base keys to generate the above-described authorized resource tables. The authorized resource tables are generated by directly interconnecting pairs of access controllers in a secure manner and initiating the table-generating process. The ensuing data exchange is encoded and secure such that the data in the resulting authorized resource tables remain unknown.

Subsequent use of the pairs of access controllers employs similar exchanges of multiple and different random number-based session keys that are different for every operating session. Their function is the encryption and decryption of the access control codes within each access controller. The detailed process for generating and using the various access control codes and authorized resource tables is described below with reference to FIGS. 3 and 6.

Because a skilled worker might be able to determine the access control codes and encryption process by reverse engineering an access controller, physical security is provided by encapsulating access controllers 16 and 18 in a suitable potting compound (shown conceptually in dashed lines). In addition, a power management and self-destruct circuit 38 employs a light-emitting diode ("LED") 40 and photo detector 42 to monitor the physical integrity of the potting compound. Access management data stored in memory 34 is maintained by a battery (not shown). If the potting compound is tampered with, ambient light or light from LED 40 is detected by photo detector 42 causing power management and self-destruct circuit 38 to remove the battery power, thereby erasing memory 34.

Alternative tampering detection circuits may employ a magnet 40 embedded and oriented in the potting compound such that its magnetic field passes through a hall-effect device 42 that detects any change in the magnetic field. Likewise, an electret material 40 may be embedded and oriented in the potting compound in proximity to an electrical field detecting device such as a capacitor plate 42 connected to the gate of an FET. The latter alternative is preferred because its low power consumption conserves battery power and maintains self-destruct capability during periods when the access controller is turned off.

An optional layer of physical integrity entails placing a LED and photodetector combination 44 in electrical connector housings such as one associated with signal interface 31, such that the above-described self-destruct process is initiated if an access controller is disconnected in an unauthorized manner from any of its associated resources. Alternative connector tampering detectors include software hand-shaking routines to detect the presence of an authorized resource and electrical continuity monitoring between an access controller and its interconnected resources. Of course, physically secure connector housings and attachments may also be employed.

Referring to FIGS. 1 and 2, authorized resource tables are preferably determined by and transferred to access controllers by a device validation process controlled by a resource access control services system ("RACS") 46. A serial number is assigned to each access controller when it is originally manufactured. Access controller production data, preferably including its user visible serial number, are mapped into an associated first ID number 48 are entered into a RACS data base 50 for each unique access controller. First ID numbers 48 are used together with other data described below to generate the authorized resource tables, access control codes, and encryption keys ("access management data") that are loaded by a RACS server 49 into access controllers, such as 16 and 18, when they are manufactured. Thereafter in field use, access management data may be updated, verified, restored, erased, or otherwise modified by directly connecting RACS server 49 through an access controller 52 and signal interfaces 31 to the appropriate access controller such as, for example, access controller 16 (as shown in dashed lines). Alternatively, RACS server 49 may remotely alter the access management data in access controller 16 through an access controller 54, signal interface 31, modem 20, and switched network 22. Of course, this process must be handled in a very secure manner employing additional measures such as pre-arranged data transfer times.

An additional layer of access control management and security is optionally provided by a central access control system ("CACS") 56 that provides a data communications pathway by which a CACS server 58 and an associated CACS data base 60 can provide, verify, and update the access management data stored in access controllers 16 and 18 of access control system 10. Preferably CACS 56 stores the access management data for all access controllers in a network of resources, thereby eliminating the need for each access controller in a CACS network to store comprehensive authorized resource tables. The secure data communications transmitted are usually parallel with and separate from the communications provided through switched network 22, thereby providing a private and dedicated means of transferring access management data from CACS 56 to all access controllers in access control system 10 on an as-needed basis. CACS 56 is particularly advantageous because it provides centralized, immediate, and consistent security maintenance for all access controllers in a local network, extended network, or remotely accessible network. Moreover, access devices connected to CACS 56 can be periodically polled to ascertain their presence, operational status, and presently connected resource. CACS 56 makes it feasible to constantly maintain and monitor the security of diversely scattered computing resources such as those found in modern business enterprises.

Access management data are preferably transferred from CACS 56 to access controllers 16 and 18 across a network, such as ETHERNET™ (ETHERNET is a trademark of the Xerox Corporation) employing cable 62, transceivers 64, and cable taps 66. Of course, other data communications means may be employed such as modems, switched networks, hard wiring, CATV cable, optical fiber, twisted pairs, cellular networks, and the like. The access management data are encrypted as described above and transferred between the appropriate access controller 16 or 18 and an access controller 68.

Access controllers 16 and 18 communicate with CACS 56 through a CACS processor 70, which is preferably an Echelon Neuron chip model MC 143150 manufactured by Motorola Semiconductor, Inc., Phoenix, Ariz. Each CACS processor has a unique serial number or second ID number 72 that is used in connection with CACS 56 access management data. Although other processor types may provide general control functions, the Neuron chip very efficiently provides communications control functions required for communications between CACS 56 and access controllers.

Access management data associated with newly manufactured access controllers may be securely transmitted from RACS server 49 to CACS 56 through an appropriate pair of access controllers 74 and signal interfaces 31. Alternatively, access controller production data 48 may be entered directly into CACS data base 60.

Figure 3A:
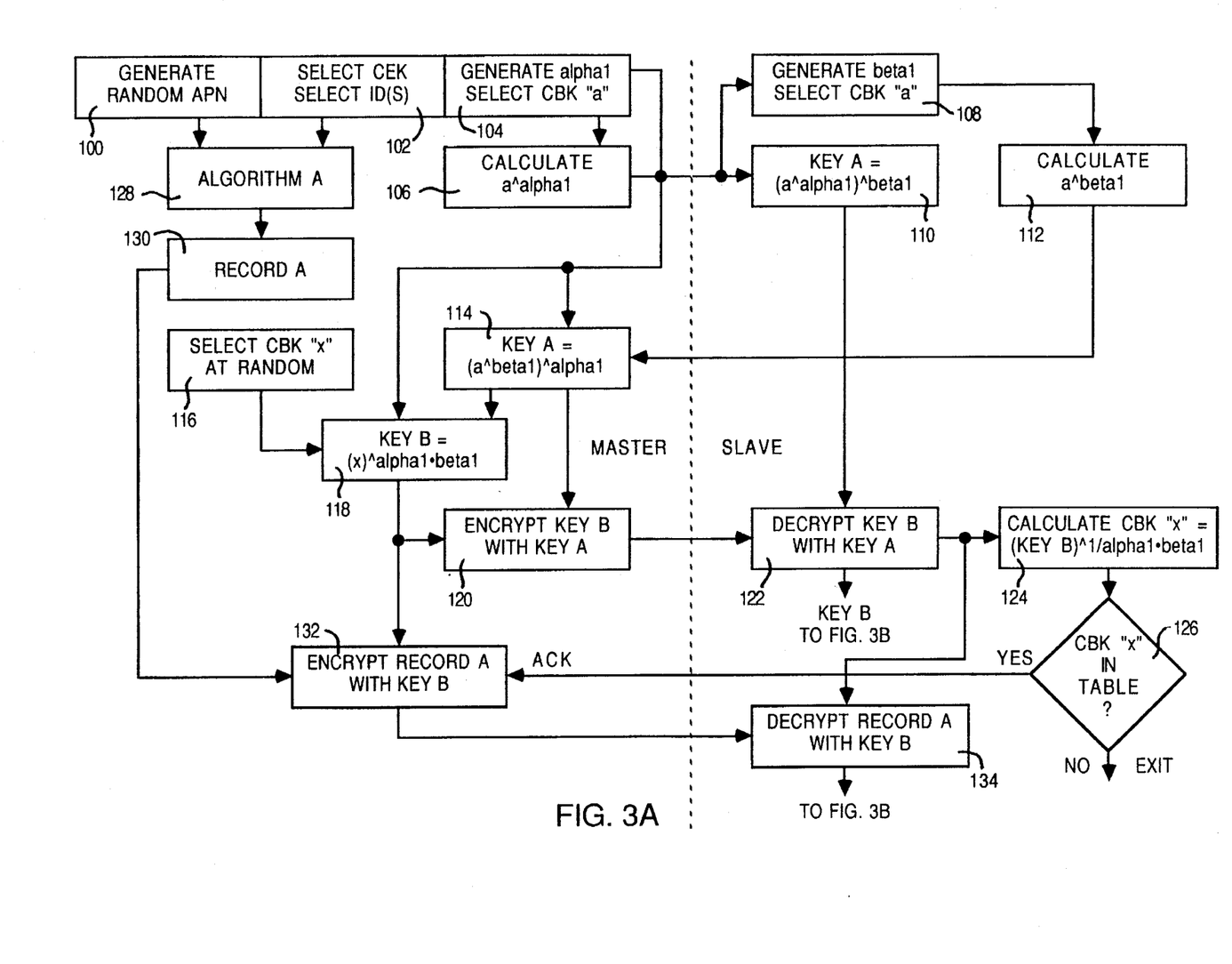
FIGS. 3A and 3B (collectively "FIG. 3") are a flow chart showing the secure process employed to generate an access authorization table and secret encryption keys used by the access controller of this invention.
Figure 3B:
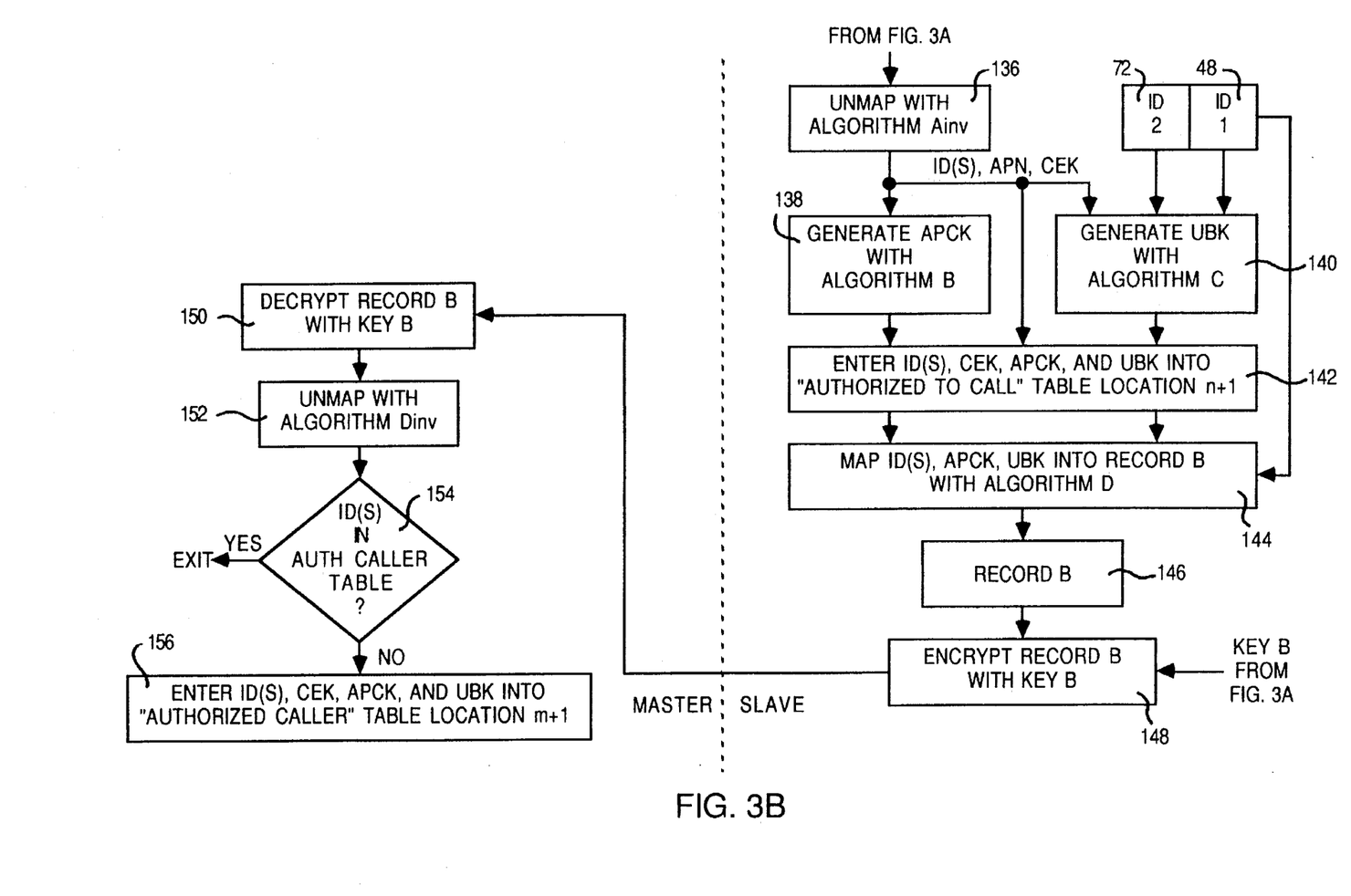

FIG. 3 shows the process by which RACS 46, or another authorized access controller, generates authorized resource table entries in an access controller. Tables 1–4 show the preferred access management data structures employed by the access controllers.

Table 1 shows a common base key table that stores 255 predetermined unique 64-bit numbers each of which is a common base key ("CBK") suitable for use with encryption processor 36. Each common base key is reduced from 64-bits to 56-bits by an initial permutation that drops parity bits 8, 16, 24 . . . 64 from the stored number. The first entry in the common base key table is referred to as CBK "a" and the last entry is referred to as CBK "zz." A randomly selected entry from the common base key table is referred to as CBK "x." All access controllers store the same common base key table.

TABLE 1

COMMON BASE KEY TABLE

| | |
|---|---|
| a | 64-bit (8-byte) number |
| b | |
| c | |
| . | |
| . | |
| . | |
| zz | 255 entries in table |

Table 2 shows a common encryption key table that stores 255 predetermined unique 64-bit numbers each of which is a common encryption key ("CEK") suitable for use with encryption processor 36. Each common encryption key is reduced from 64-bits to 56-bits by an initial permutation that drops parity bits 8, 16, 24 ... 64 from the stored number. The first entry in the common encryption key table is referred to as CEK-1 and the last entry is referred to as CEK-255 A randomly selected entry from the common encryption key table is simply referred to as CEK. All access controllers store the same common encryption key table.

TABLE 2

COMMON ENCRYPTION KEY TABLE

| | |
|---|---|
| 1 | 64-bit (8-byte) number |
| 2 | |
| 3 | |
| . | |
| . | |
| . | |
| 255 | 255 entries in table |

Table 3 shows a common algorithm table that stores at least six algorithms, referred to as algorithms A–F, each of which performs a predetermined data mapping operation on bits and/or bytes of data employed in the process of generating or verifying access management data. All access controllers store the same common algorithm table. Of course, many other algorithms would work equally well, provided the same algorithms are stored in all intercommunicating access controllers.

TABLE 3

COMMON ALGORITHM TABLE

| | |
|---|---|
| A | Master ID(s), APN, CEK append; split record; transpose bytes in each half; XOR halves forming new right half; left-shift nibble right half; recombine. |
| Ainv | Unmap record mapped by algorithm A. |
| B | Master ID(s), APN, CEK append; split record; transpose bytes in each half; XOR halves forming new right half; right-shift nibble both halves; recombine. |
| C | Slave ID(s), ID2, APN, append; split record; transpose bytes in each half; XOR halves forming new right half; left-shift 6-bits right half; recombine. |
| D | Slave ID(s), APCK, UBK, append; split record; transpose bytes both halves; XOR halves forming new right half; right-shift 6-bits both halves; recombine. |
| Dinv | Unmap record mapped by algorithm D. |
| E | Master ID(s), alpha2 append; split record; transpose bytes in each half; XOR halves forming new right half; swap odd and even bytes in right half; recombine. |
| Einv | Unmap record mapped by algorithm E. |
| F | beta2, slave ID(s) append; split record; transpose bytes in each half; XOR halves forming new right half; mirror bits bytes of both halves; recombine. |
| Finv | Unmap record mapped by algorithm F. |

TABLE 3-continued

COMMON ALGORITHM TABLE

Table 4 shows an authorized resource table that stores up to 250 authorized resource pair entries. The entry pairs are in "authorized caller" and "authorized to call" categories. Each resource pair entry includes a slave serial number ("SSN"), a master serial number ("MSN"), the common encryption key CEK, an authorized pair challenge key ("APCK"), and a unique base key ("UBK"). UBKs are created when the authorized resource table is generated for each resource pair. Preferably MSN and SSN each include the user visible serial number and are 6-bytes long. CEK, APCK, and UBK each are 8-bytes long.

TABLE 4

| AUTHORIZED CALLERS | AUTHORIZED TO CALL |
|---|---|
| 1. SSN, CEK, APCK, UBK | 1. MSN, CEK, APCK, UBK |
| 2. SSN, CEK, APCK, UBK | 2. MSN, CEK, APCK, UBK |
| 3. SSN, CEK, APCK, UBK | 3. MSN, CEK, APCK, UBK |
| . | . |
| . | . |
| . | . |
| m. Up to 250 entries | n. Up to 250 entries |

Referring to FIGS. 1, 2, and 3, the authorized resource table is preferably generated by employing the following process.

Access controllers 16 and 18 are electrically connected together and a program switch on each access controller selects a functional operating mode for its respective access controller according to selections shown below in table 5.

TABLE 5

| | ACTIVE | DEFEAT | ACTIVE | DEFEAT |
|---|---|---|---|---|
| ACCESS CONTROLLER 16 = | | | | |
| Case 1 | Master | Slave | Master | N.A. |
| Case 2 | Slave | | | |
| ACCESS CONTROLLER 18 | | | | |
| Case 1 | Slave | Master | Slave | N.A. |
| Case 2 | Master | | | |

In table 5, the term "master" refers to a responder resource, and the term "slave" refers to a requesting resource, as in a case where the slave serves the master.

Set both switches to the active position and initiate the following process to generate an authorized caller and authorized to call entries in the authorized resource tables.

1. At master access controller 18:

a random number generator block 100 generates a 4-byte random number APN;

an initialization block 102 selects the CEK to be associated with this authorized resource pair from the CEK table;

an encryption key initialization block 104 generates a 4-byte random number alpha1 and selects CBK "a" to start establishing a first encryption key; and a processing block 106 raises a CBK "a" to the alpha1 power and sends a^alpha1 encrypted by CEK-1 to slave access controller 16.

2. At slave access controller 16:

an initialization block 108 receives a^alpha1 and decrypts it with CEK-1, generates a random number beta 1, and selects CBK "a" from the CBK table;

a processing block 110 calculates key A by raising a^alpha1 to the beta1 power; and a processing block 112 raises common base key "a" to the beta1 power and sends a^beta1 encrypted by CEK-1 to master access controller 18.

3. At master access controller 18:

a processing block 114 receives a^beta1, decrypts it with CEK-1, and calculates key A by raising a^beta1 to the alpha1 power;

a selection block 116 randomly selects a session key CBK "x" from the CBK table;

a processing block 118 calculates key B by raising x to the alpha1*beta1 power; and an encryption block 120 encrypts key B using key A and sends it to slave access controller 16.

4. At slave access controller 16:

a decryption block 122 decrypts key B using key A;

a processing block 124 calculates CBK x by taking the beta1*alpha1 root of key B;

a decision block 126 determines whether CBK x exists in the CBK table to verify that calculated key B is valid;

if CBK x is not in the CBK table, the process exits; but if CBK x is in the CBK table, an acknowledgement is sent to master access controller 18.

5. At master access controller 18:

when the acknowledgement is received, an algorithm block 128 employs algorithm A to map APN, master ID(s)(first ID number 48), and CEK into an 18-byte record A 130; and an encryption block 132 encrypts record A using key B and sends it to slave access controller 16.

6. At slave access controller 16:

a decryption block 134 decrypts record A using key B;

an algorithm block 136 unmaps record A using the inverse of algorithm A;

a register block 138 generates an APCK by employing algorithm B;

a register block 140 generates a UBK using first ID number 48, second ID number 72, and APN by employing algorithm C;

a parsing block 142 enters master ID(s), CEK, APCK, and UBK into the "authorized to call" category of the authorized resource table at location n+1, where "n" is the number of previous entries;

a mapping block 144 employs algorithm D to map slave ID(s), APCK, and UBK into a 40-byte record B 146; and an encryption block 148 encrypts record B using key B and sends it to master access controller 18.

7. At master access controller 18:

a decryption block 150 decrypts record B using key B;

an algorithm block 152 unmaps record B employing the inverse of algorithm D;

a decision block 154 determines whether the slave ID(s) match an existing slave ID(s) in the "authorized caller" section of the authorized resources table;

if slave ID(s) matches, exit because this access controller pair is already authorized; otherwise a parsing block 156 enters slave ID(s), CEK, APCK, and UBK into the "authorized caller" section of the authorized resource table at location m+1, where "m" is the number of previous entries.

Entering blocks 142 and 156 together, enter an authorized resource pair in the authorized resource table.

Numerical accuracy is maintained in the processing blocks of the above-described authorized resource table generation process by employing well-known modulus arithmetic techniques.

Figure 4:
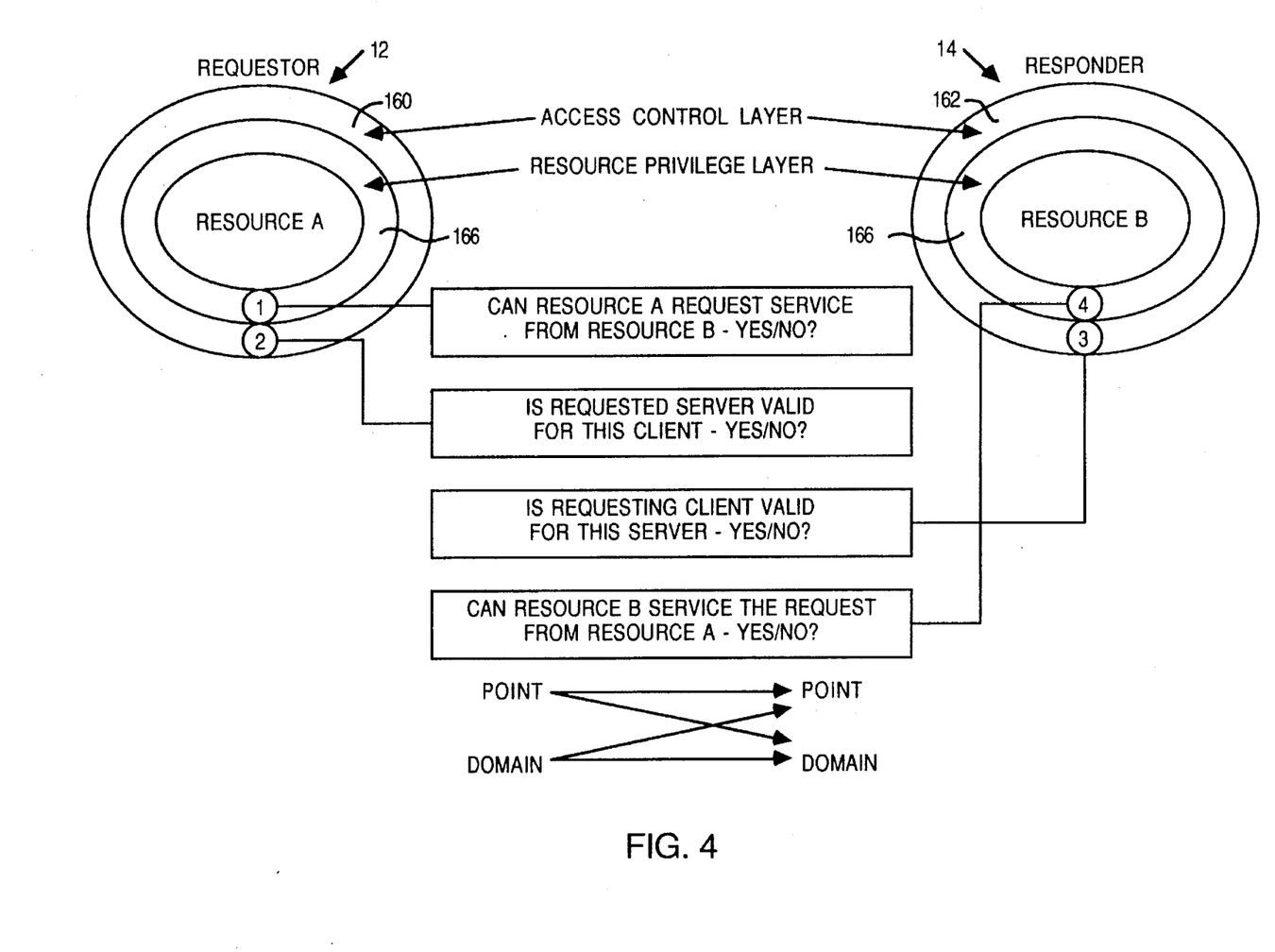
FIG. 4 is a schematic block diagram showing the various levels of resource access control that can be achieved with this invention.

FIG. 4 shows the multi-level authorization capability existing among access controllers because of the authorized resource tables. Also referring to FIG. 1, access controller 16 is connected to a requestor such as computer 12 at an access control level 160, and access controller 18 is connected to a responder such as computer 14 at an access control level 162. Requestor 12 and responder 14 are also connected through tranceivers 64, cable taps 66, network cable 62, and access controller 68 to CACS 56. Resources A and B may be, for example, particular application programs associated with computers 12 and 14. Other resources, such as CACS data base 60, switched network 22, and RACS data base 50, may have resource privilege layers 166 that are selectively accessible through their respective access controllers 68, 16, 18, and 54. Point-to-point communications may be authorized in either direction between computers 12 and 14, whereas point-to-domain communications may be authorized when CACS 56 requests access to resources associated with both of computers 12 and 14 or elsewhere on network cable 62. However, no communications may be authorized when computers 12 or 14 request access to resources associated with CACS 56.

Alternative ways of generating authorized resource tables include the above-described mating of access controllers, by downloading them from CACS 56, and by linking pairs of access controllers to RACS 46.

Figure 5:
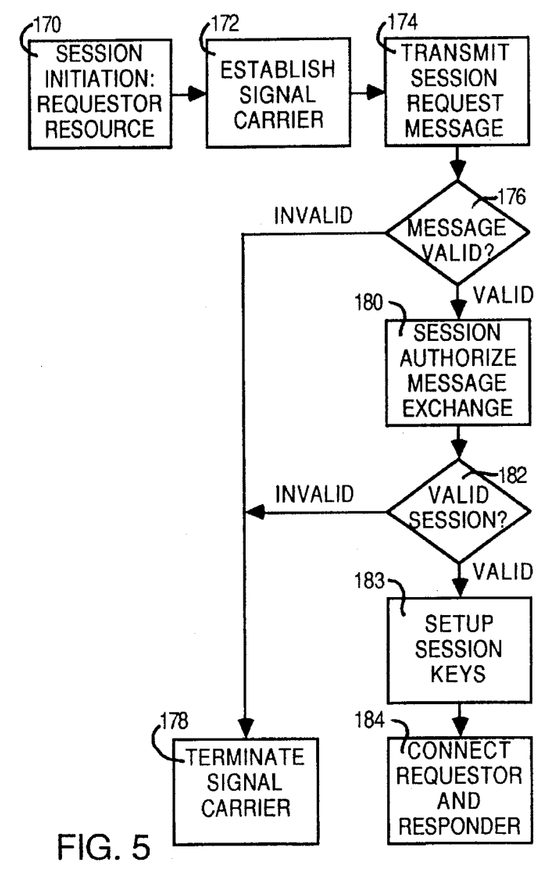
FIG. 5 is a simplified flow chart showing the process followed by a pair of access controllers to establish a valid connection between a requesting resource and a responding resource.

After authorized resource tables are established in access controllers such as 16 and 18, valid requests for access to resources result in communication exchanges referred to as "sessions." FIGS. 1 and 5 show the process followed to establish a session between a requestor, such as 12, and a responder such as 14.

Requestor 12 attempts to initiate a session at session initiation block 170.

Responder associated modem 20 responds by establishing a carrier at carrier block 172.

Requestor 12 transmits a session request message through access controller 16 at request block 174.

A decision block 176 scans the authorized resource table in access controller 16 to determine whether requestor 12 is authorized to call responder 14.

If a valid authorized resource pair is not found, access controller 16 signals associated modem 20 to terminate the carrier at carrier termination block 178.

However, if a valid authorized resource pair is found, access controller 16 sends the session request message via a message exchange block 180 through modems 20 and switched network 22 to access controller 18. Modem 20 associated with access controller 18 responds with its carrier.

A decision block 182 scans the authorized resource table in access controller 16 to determine whether requestor 12 is an authorized caller of responder 14.

If a valid authorized resource pair is not found, access controller 16 signals associated modem 20 to terminate its carrier at carrier termination block 178. Modem 20 associated with access controller 18 responds by terminating its carrier, and the process exits.

However, if a valid authorized resource pair is found, access controller 16 responds to the session request message through modems 20 and switched network 22 to access controller 18 by setting up session establishing keys at a control block 183.

A connecting block then connects requester 12 and responder 14 for data communication encrypted by the session keys.

Requestor 12 and responder 14 may be interconnected by other than modems 20 and switched network 22. Interconnections may be made through ETHERNET™, IEEE-488, direct RS-232 connections, cellular radio, CATV cable, hard wiring, SCSI buses, and the like. In many such cases, the carrier signals are substituted by appropriate handshaking signals or protocols.

Figure 6A:
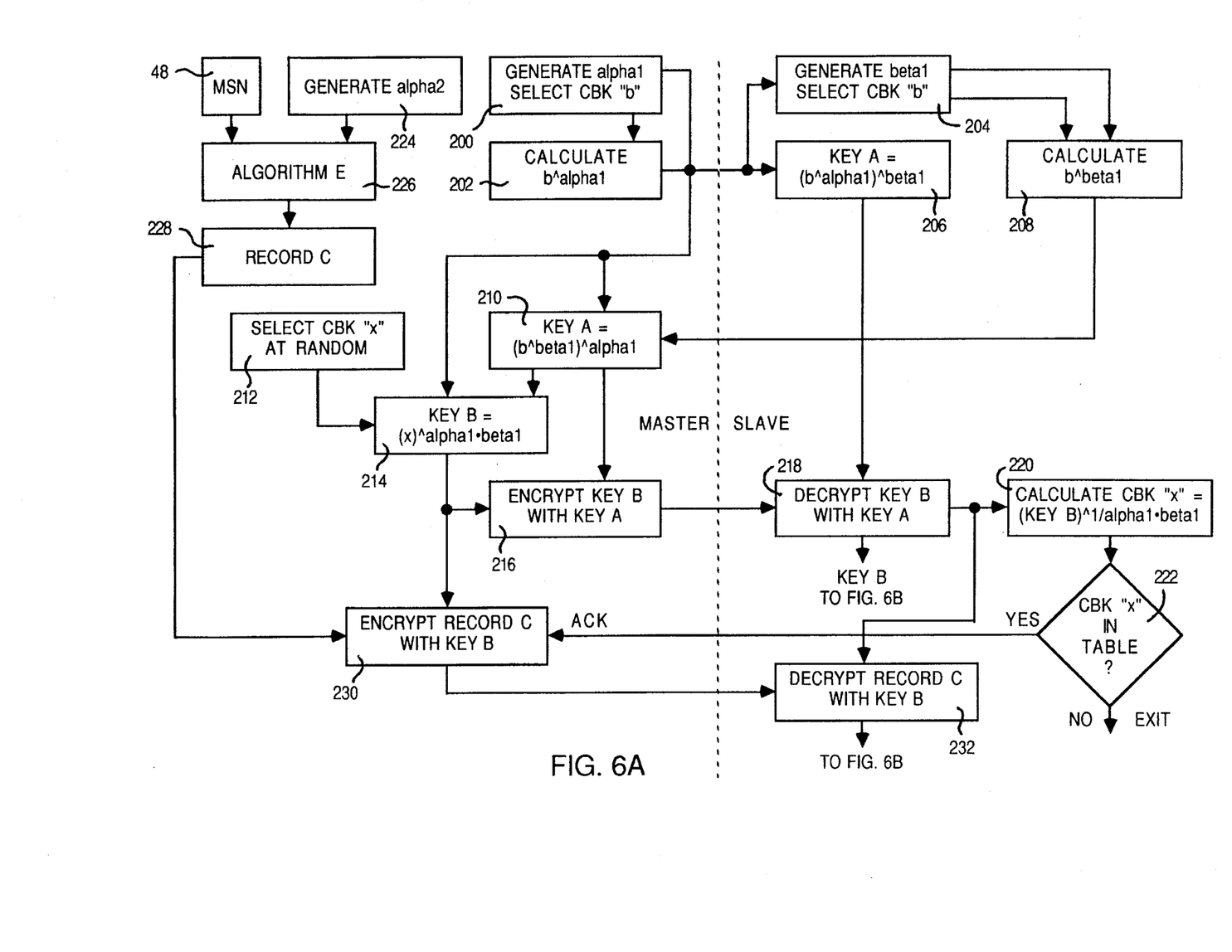
FIGS. 6A and 6B (collectively "FIG. 6") are a flow chart showing the secure process employed to establish a communication session and communicate between access controllers of this invention.
Figure 6B:
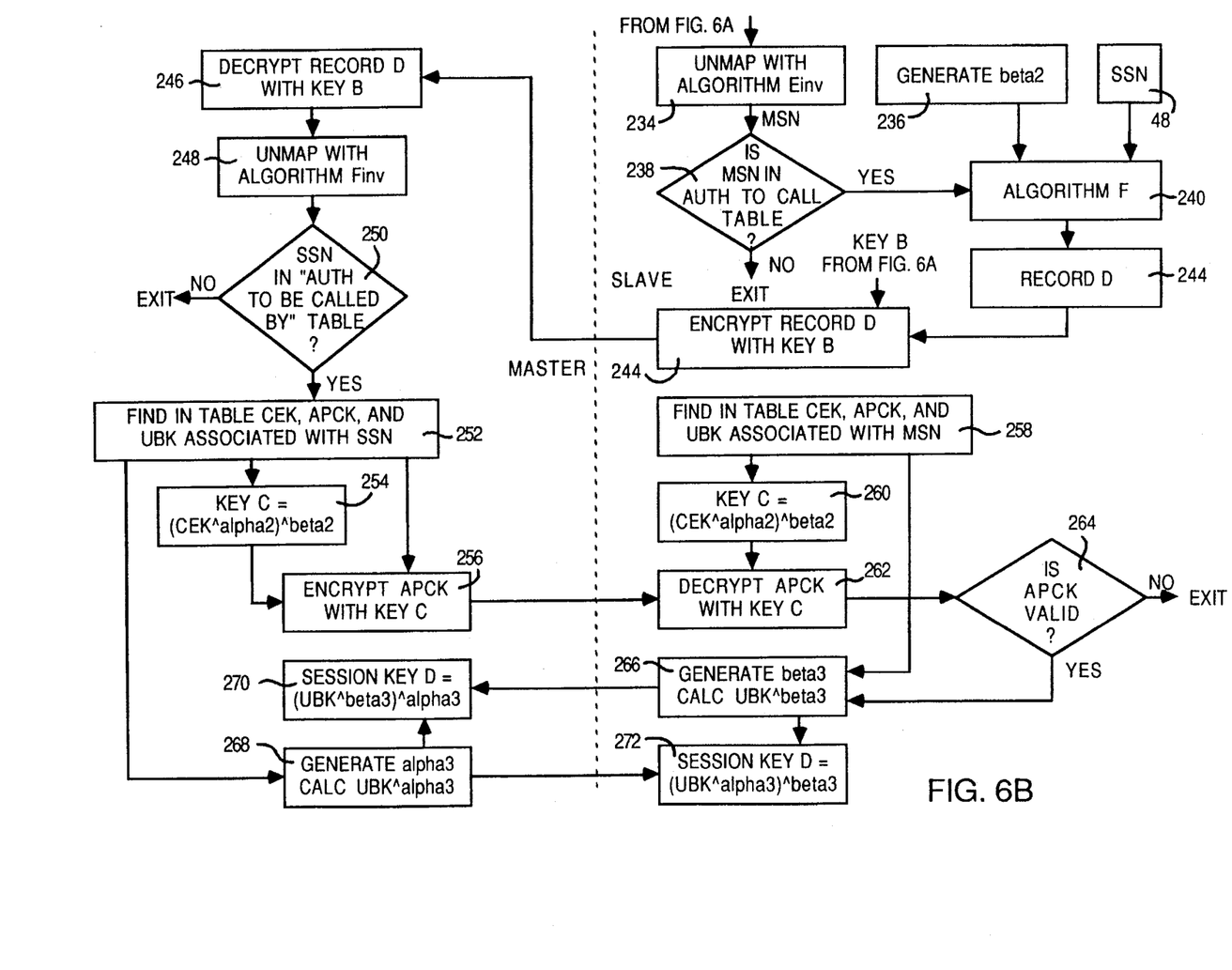

FIGS. 1 and 6 show a preferred process followed by the above-described session establishing message exchange. In the process, assume access controller 18 is the master and access controller 16 is the slave. A dashed line in FIG. 6 shows the delineation between master and slave process steps.

Before the session establishing process starts, access controllers 16 and 18 exchange serial number data encrypted by a predetermined key to mutually verify they are a valid resource pair.

1. At master access controller 18:

an encryption key initialization block 200 generates a 4-byte random number alpha1 and selects CBK "b" to start establishing a first encryption key; and a processing block 202 raises CBK "b" to the alpha1 power and sends a^alpha1 encrypted by CEK-1 to slave access controller 16.

2. At slave access controller 16:

an initialization block 204 receives a^alpha1 and decrypts it with CEK-1, generates a random number beta 1, and selects CKB "b" from the CBK table;

a processing block 206 calculates key A by raising b^alpha1 to the beta1 power; and a processing block 208 raises common base key "b" to the beta1 power and sends b^beta1 encrypted by CEK-1 to master access controller 18.

3. At master access controller 18:

a processing block 210 receives b^beta1, decrypts it with CEK-1, and calculates key A by raising b^beta1 to the alpha1 power;

a selection block 212 randomly selects a session key CBK "x" from the CBK table;

a processing block 214 calculates key B by raising x to the alpha1*beta1 power; and an encryption block 216 encrypts key B using key A and sends it to slave access controller 16.

4. At slave access controller 16:

a decryption block 218 decrypts key B using key A;

a processing block 220 calculates CBK x by taking the beta1,alpha1 root of key B;

a decision block 222 determines whether CBK x exists in the CBK table to verify that calculated key B is valid;

if CBK x is not in the CBK table, the process exits; but if CBK x is in the CBK table, an acknowledgement is sent to master access controller 18.

5. At master access controller 18:

a random number generation block 224 generates a second random number alpha2 to begin establishing a third encryption key;

an algorithm block 226 generates a record C 228 by mapping MSN 48 and alpha2 into a 20-byte record by employing algorithm E; and an encryption block 230 encrypts record C using key B and sends it to slave access controller 16.

6. At slave access controller 16:

a decryption block 232 decrypts record C using key B;

an algorithm block 234 unmaps record C employing the inverse of algorithm E;

a random number generation block 236 generates a random number beta2 to begin establishing a third encryption key;

a searching block 238 scans the "authorized to call" table for a match to MSN;

if MSN is not found, the process exits;

if MSN is found, an algorithm block 240 generates a record D 242 by mapping SSN 48 and beta2 into a 20-byte record using algorithm F; and an encryption block 244 encrypts record D using key B and sends it to master access controller 18.

7. At master access controller 18:

a decryption block 246 decrypts record D using key B;

an algorithm block 248 unmaps record D using the inverse of algorithm F;

a decision block 250 searches the "authorized to be called by" table for a valid entry of SSN 48;

if SSN 48 is not found, the process exits;

if SSN 48 is found, a register block 252 stores the CEK, APCK, and UBK associated with SSN 48;

a processing block 254 calculates key C by raising CEK to the alpha2,beta2 power; and an encryption block 256 encrypts APCK with key C and sends it to slave access controller 16.

8. At slave access controller 16:

a register block 258 stores the CEK, APCK, and UBK associated with the MSN found in the authorized resource table;

a processing block 260 calculates key C by raising CEK to the alpha2*beta2 power;

a decryption block 262 decrypts APCK from master access controller 18 using key C;

a decision block 264 compares decrypted APCK with APCK stored in register block 258 to determine its validity;

if APCK does not match, it is invalid and the process exits; otherwise if APCK is valid, a processing block 266 generates a third random number beta3, raises UBK stored in register 258 to the beta3 power, and sends UBK^beta3 to master access controller 18.

9. At master access controller 18:

a processing block 268 generates a third random number alpha3 and raises UBK stored in register block 252 to the alpha3 power and sends UBK^alpha3 to slave access controller 16; and a processing block 270 calculates session encryption key D by raising UBK^beta3 received from slave access controller 16 to the alpha3 power.

10. At slave access controller 16:

a processing block 272 calculates session encryption key D by raising UBK^alpha3 from access controller 16 to the beta3 power.

For the session just authorized, data transferred between access controllers 16 and 18 are encrypted by loading session key D into encryption processor 36 in the associated access controllers. Subsequent session authorization processes will each generate a different session key D.

Alternatively, additional security my be provided by similarly generating a unique 64-bit initial vector and loading it and session key D into encryption processor 36 to implement well-known cipher block chaining. Additional security may also be provided by decrypting the UBKs stored in the authorized resource tables with session key D and unmapping them with an algorithm rather than using the direct table lookup process.

Numerical accuracy is maintained in the processing blocks of the above-described session authorization process by employing well-known modulus arithmetic techniques.

Alternative ways of establishing authorized sessions include the above-described master and slave access controller process, a resource accessing CACS 56 through the parallel control network to determine if another resource is valid, and the resource accessing CACS 56 through switched network 22 to determine if the other resource is valid. Of course, the "resource" may be a requestor, a responder, a point, or a domain resource.

A summary of security features and benefits provided by the above-described access controllers, table generation process, and session authorization process include:

multiple and different keys, random numbers, and algorithms are employed to generate the authorized resource table entries;

multiple and different keys, random numbers, and algorithms are employed to establish authorized sessions;

the authorized resource table generating process and session authorizing process are user transparent, easy to use, and maintain key secrecy; and the self-destruct mechanisms protect the authorized resource tables and key tables from tampering and reverse engineering.

Many operational and security enhancements may be alternatively provided, including:

an access controller may count a number of failed access attempts associated with a particular caller, and disconnect the modem from the access controller after a predetermined number of attempts;

a set of user options 280 (FIG. 1) may include a keypad, a display, a card reader, a thumb print reader, an eye scanner, and the like;

a switch or keypad entry may disable or enable session encryption or bypass data directly through an access controller;

the keypad may be employed to disable an access controller until a user defined PIN number is entered;

a code may be sent to the access controller or entered at the keypad to disable all authorized resource table maintenance except through a remote service such as RACS 46 or CACS 60; and a code may be entered that starts a failure recovery process if a master access controller fails.

Figure 7:
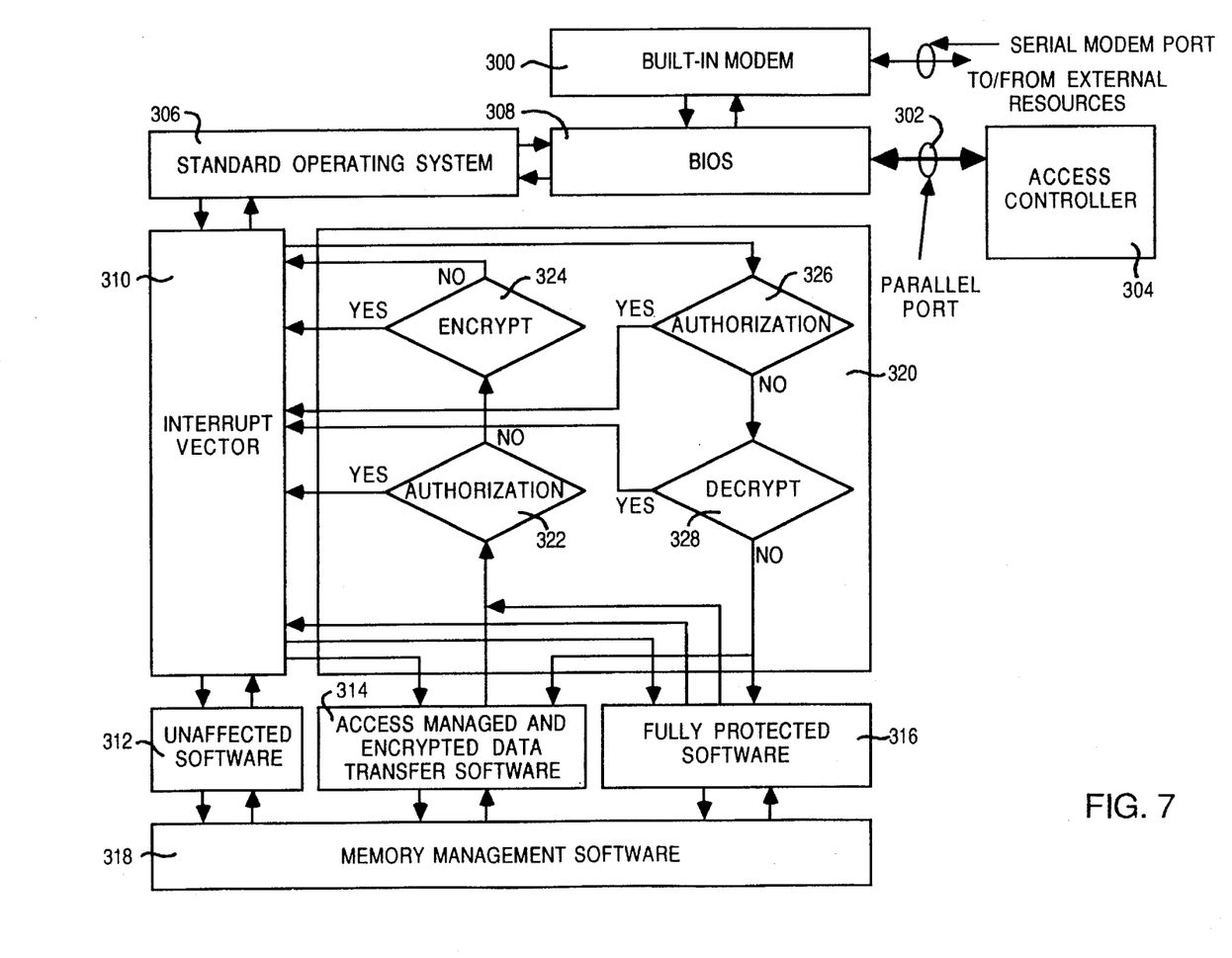
FIG. 7 is a simplified block diagram showing software and hardware data flow pathways employed by a computer with a built-in modem in which an access controller is connected to a parallel port to implement an alternate embodiment of this invention.

Access controllers may be imbedded in or attached to a variety of resource types to implement secure embodiments of the resource. For example, FIG. 7 represents a secure implementation in a portable personal computer ("PC") of a type having an internal modem 300, or a modem on a PCMCIA card. Such a PC configuration does not allow connecting an access controller between internal modem 300 and the serial port as shown in FIG. 1. However, if the PC has a parallel port 302, an access controller 304 may be connected thereto to provide functionality equivalent to that provided by the configuration shown in FIG. 1.

The PC includes a standard operating system 306, a BIOS module 308, and an interrupt vector module 310. Software executed on the PC can be grouped into three categories: software not requiring access control is referred to as unaffected affected 312; access managed and/or encrypted software that communicates with the built-in modem 300 and access controller 302 is referred to as access managed data transfer software 314; and fully protected software 316. All software categories are loaded and run on the PC under conventional control of memory management software 318.

Data transfers among access managed and encrypted data transfer software 314, fully protected software 316, interrupt vector module 310, and operating system 306 are routed through encryption and authorization software 320, whereas data transfers among unaffected software 312, interrupt vector module 310, and operating system 306 are not routed through encryption and authorization software 320.

Encryption and authorization software 320 intercepts and examines all interrupt requests and data transfers to or from access managed data transfer software 314. Outgoing data requesting access to built-in modem 300 is identified by an outgoing authorization decision block 322. The session authorization process previously described is initiated by routing the request for built-in modem 300 to access controller 304 through interrupt vector module 310. During the session authorization process, all data intended for built-in modem 300 is routed through access controller 304. When a valid session is established, all outgoing data requiring encryption are identified by an encryption decision block 324 and routed to access controller 304 for encryption. After encryption, the data are returned to encryption and authorization software 320 for routing through interrupt vector module 310, standard operating system 306, and BIOS 308 to built-in modem 300.

The inverse process is supported to handle incoming calls from access-managed resources to built-in modem 300. An incoming call interrupt from built-in modem 300 is intercepted by encryption and authorization software 320, identified by incoming authorization decision block 326, and the above-described session authorization process is initiated by routing the session request from built-in modem 300 to access controller 304 through interrupt vector module 310. When a valid session has been established, incoming data requiring decryption are identified by a decryption decision block 328 and routed to access controller 304 for decryption. After decryption, the data are returned to encryption and authorization software 320 for routing to access managed data transfer software 314.

Skilled workers will recognize that portions of this invention may have alternative embodiments. For example, access controllers under control of CACS 56 can vary associated ETHERNET™ block sizes on the fly to improve network utilization efficiency and throughput. Multiple versions of access controllers, signal interfaces, processors, and the like may include versions adapted to operate with expansion boards, video signals, keyboard interfaces, ETHERNETS™, spread spectrum devices, ISA/EISA/MCA/NuBus/controllers, PC parallel ports, RJ-11 connectors, PCMCIA boards, and SCSI buses. Likewise, versions incorporating higher performance processors may be adapted to improve performance in demanding applications. Access controllers may also be adapted to manage system resource configurations and work group networking under control of CACS 56. Finally, various key and encryption methods other than DES may be employed in whole or to portions of the above-described access controller protocols.

It will be obvious to those having skill in the art that many changes may be made to the details of the above-described embodiments of this invention without departing from the underlying principles thereof. Accordingly, it will be appreciated that this invention is also applicable to resource access management applications other than those found in personal computer systems. The scope of the present invention should, therefore, be determined only by the following claims.

We claim:

1. A system for transferring secure data across a data communication medium between first and second computer system resources, comprising:

first and second access controllers electrically connected to the data communication medium and to respective ones of the first and second resources, for transferring the secure data during a data transfer session after verifying that the first and second resources are both associated with at least one authorized access code;

the access controllers each including:

a memory storing a table of encryption keys, a table of algorithms, and a table of authorized resources that associates pairs of resources with authorized access control codes, the encryption keys and algorithms being identical in each access controller;

a processor randomly generating for the data transfer session, plural numbers and utilizing an access controller identifying number, the randomly generated numbers, selected ones of the stored algorithms, and a predetermined one of the stored encryption keys to generate in cooperation with the other access controller a unique session key; and an encryption/decryption processor using the unique session key to encrypt the secure data transferred across the data communication medium.

2. The system of claim 1 in which the resources are selected from a group consisting of: computers, software, servers, networks, data bases, communications switches, communication controllers, mass memory devices, printers, and disk drives.

3. The system of claim 1 in which the communication medium is selected from a group consisting of: a modem, a network, a radio frequency transmission, a SCSI bus, an IEEE-488 bus, an RS-232 interconnection, a cellular radio, a CATV cable, an optical fiber, a switched network, and electrical wiring.

4. The system of claim 1 in which the access controllers verify an access level of authorization and a resource privilege level of authorization before connecting their respective first and second resources to the data communication medium.

5. The system of claim 1 in which the access controllers generate a new unique session key for each subsequent data transfer session.

6. The system of claim 1 further including a communication pathway that interconnects at least one of the access controllers to a central access control system that communicates access control code information to the access controllers through the communication pathway.

7. The system of claim 6 in which the communication pathway is selected from a group consisting of: the communication medium, a modem, a network, tan Ethernet,] a radio frequency transmission, a SCSI bus, an IEEE-488 bus, a computer bus, an RS-232 interconnection, a cellular radio, a CATV cable, an optical fiber, a switched network, and electrical wiring.

8. The system of claim 1 in which a major portion of at least one of the access controllers is encapsulated in a potting compound and the access controller further includes a self-destruct mechanism that erases the memory in response to detecting tampering with the potting compound.

9. The system of claim 8 in which the self-destruct mechanism includes an electret material oriented in the potting compound in proximity to an electric field detecting device.

10. A method for generating a table of authorized resources entry for use in a secure access control system, comprising:

establishing a secure data communication dialog between first and second access controllers;

storing in each access controller, a table of encryption keys, a table of algorithms, and a table of authorized resources that associates pairs of access controllers with authorized access control codes, the tables of encryption keys and algorithms being identical in each access controller;

generating a unique base key associated with the first and second access controllers by using the secure data communication dialog to exchange data derived from predetermined ones of the encryption keys and the algorithms; and associating the first and second access controllers with the unique base key in the table of authorized resources of the first and second access controllers.

11. The method of claim 10 in which the first access controller is associated with a resource access control system that stores an ID number in the first access controller, the ID number being related to a production serial number of the first access controller.

12. A method for generating and using encryption keys to authorize and encrypt data exchanged between first and second computer system resources, comprising:

providing a master access controller and a slave access controller each including a processor and a memory;

storing in the memories tables of authorized resources and identical base key tables, encryption key tables, and algorithm tables;

randomly generating in the master access controller a number alpha1;

selecting a predetermined base key "a" from the master access controller base key table;

calculating "a"^alpha1;

randomly generating in the slave access controller a number beta1;

selecting the predetermined base key "a" from the slave access controller base key table; determining a key A in the slave access controller by calculating "a"^alpha1)^beta1;

calculating "a"^beta1;

determining key A in the master access controller by calculating ("a"^beta1)^alpha1;

selecting a base key x at random from the master access controller base key table;

determining a key B by calculating (x) ^alpha1*beta1;

determining base key x in the slave access controller by calculating (key B)^(1/beta1*alpha1); and determining that base key x exists in the slave access controller base key table to verify the validity of key B.

13. The method of claim 12 further including:

mapping into a record A, a master access controller ID number, and an encryption key selected from the master access controller encryption key table;

unmapping record A in the slave access controller;

generating from record A a unique base key;

entering the master access controller ID number, the encryption key and the unique base key into the slave access controller table of authorized resources;

mapping a slave access controller serial number and the unique base key into a record B;

unmapping record B in the master access controller; and entering the slave access controller serial number, the encryption key and the unique base key into the master access controller table of authorized resources.

14. The method of claim 12 in which predetermined base key "a" is replaced by a predetermined base key "b" and the method further comprises:

randomly generating in the master access controller a number alpha2;

mapping the master access controller ID number and alpha2 into a record C;

unmapping record C in the slave access controller;

randomly generating in the slave access controller a number beta2;

searching the slave access controller table of authorized resources for a match to the master access controller ID number;

mapping into a record D if a match to the master access controller ID number is found a slave access controller ID number and beta2;

unmapping record D in the master access controller;

searching the master access controller table of authorized resources for an existing entry including the slave access controller ID number;

storing in the master access controller table of authorized resources if the slave access controller ID number is found, the encryption key and the unique base key associated with the slave access controller ID number;

searching the slave access controller table of authorized resources for an existing entry including the master access controller ID number;

storing in the slave access controller table of authorized resources if the slave master controller ID number is found, the encryption key and unique base key associated with the master access controller ID number;

randomly generating in the slave access controller a number beta3, calculating unique base key^beta3 and sending unique base key^beta3 to the master access controller;

randomly generating in the master access controller a number alpha3;

calculating unique base key^alpha3 and sending unique base key^alpha3 to the slave access controller;

determining a session key in the master access controller by calculating (the unique base key^beta3)^alpha3;

determining the session key in the slave access controller by calculating (the unique base key^alpha3)^beta3; and transferring data between the first and second computer system resources by encrypting and decrypting the data in the associated access controllers using the session key.

15. A system for transferring secure data across a data communication medium between first and second computers comprising:

first and second access control means in communication with the data communication medium and with associated ones of the first and second computers, for transferring the secure data after verifying that the first and second computers are both associated with the authorized access control code;

the first and second access control means each having an associated memory for storing a table of predetermined encryption keys and a table of authorized resources for associating the first and second computers with an authorized access control code, and an associated processor for randomly generating numbers and using the randomly generated numbers in cooperation with a predetermined one of the stored encryption keys to generate in data communication with the other access control means a session key; and an encryption/decryption processor using the session key to encrypt the secure data transferred across the data communication medium.

16. The system of claim 15 further including a self-destruct means that erases the associated memory in response to detecting tampering with the access control means.

17. The system of claim 16 in which the self-destruct means detects tampering with an electromechanical means coupled to at least one of the associated memory and a data communication connection.

18. The system of claim 15 in which at least a portion of one of the access control means is integral with its associated computer.

19. The system of claim 18 in which the communication medium is a switched network and each of the access control means is connected to the switched network through a modem.

20. The system of claim 19 in which the modem is integral with its associated access control means.

21. The system of claim 15 further including a communication pathway that interconnects the first access control means to a central access control system that includes at least a portion of the associated memory.

22. The system of claim 21 in which the communication pathway is selected from a group consisting of: the communication medium, a network, a radio frequency transmission, a SCSI bus, an IEEE-488 bus, an RS-232 interconnection, a cellular radio, a CATV cable, an optical fiber, a switched network, and electrical wiring.

23. A method for generating and using encryption keys to authorize and encrypt data transferred between first and second computer system resources, comprising:

providing a master access controller and a slave access controller each including a processor and a memory;

storing in the memories tables of authorized resources and identical encryption key tables;

randomly generating in the master access controller and the slave access controller respective first and second numbers;

selecting from the master access controller encryption key table and the slave access controller encryption key table a first predetermined encryption key;

determining in the master access controller and the slave access controller a key A by processing the first predetermined encryption key with the first and second randomly generated numbers;

selecting at random from the master access controller encryption key table a second encryption key;

determining a key B in the master access controller by processing the second encryption key with the first and second randomly generated numbers; and encrypting key B with key A and sending encrypted key B to the slave access controller, 24. The method of claim 23 further including:

determining in the slave access controller the second encryption key by processing key B with the first and second randomly generated numbers; and verifying that key B exists by determining whether the second encryption key exists in the slave access controller encryption key table.

25. The method of claim 23 further including:

providing the master access controller with a master access controller ID number and the slave access controller with a slave access controller ID number;

encrypting the master access controller ID number and sending the master access controller ID number to the slave access controller;

determining in the slave access controller a unique code by processing the master access controller ID number and the slave access controller ID number;

entering the master access controller ID number and the unique code into the slave access controller table of authorized resources;

encrypting the slave access controller ID number and the unique code and sending them to the master access controller; and entering the slave access controller ID number and the unique code into the master access controller table of authorized resources.

26. The method of claim 25 further comprising:

encrypting the master access controller ID number and sending the master access controller ID number to the slave access controller;

encrypting the slave access controller ID number and sending the slave access controller ID number to the master access controller if the master access controller ID number is an existing entry in the slave access controller table of authorized resources;

registering the unique code associated with the slave access controller ID number if the slave access controller ID number is an existing entry in the master access controller table of authorized resources;

registering the unique code associated with the master access controller ID number if the master access controller ID number is an existing entry in the slave access controller table of authorized resources;

determining a session key in the master access controller and the slave access controller by processing the unique code registered in each access controller; and decrypting with the session key the data transferred between the first and second computer system resources.

27. A method for authorizing access to and encrypting data transferred between first and second computer system resources, comprising:

connecting together through a first data communication medium first and second access controllers each associated with a table of authorized resources;

generating in the table of authorized resources an authorized resource pair entry associating the first and second access controllers;

detaching the first and second access controllers;

attaching the first and second access controllers to respective ones of the first and second computer system resources;

connecting the first and second access controllers through a second data communication medium;

exchanging data between the first and second access controllers to verify that both access controllers are associated by the authorized resource pair entry in the associated table of authorized resources;

establishing a session encryption key; and encrypting and decrypting with the session key data transferred across the second data communication medium between the first and second computer system resources.

28. The method of claim 27 further including the step of providing each of the first and second access controllers with a memory and storing the table of authorized resources in the memory.

29. The method of claim 27 in which the connecting together and generating steps are carried out in data communication with a resource access control system that provides the table of authorized resources with identifying data unique to the first and second access controllers.

30. The method of claim 27 further including the steps of providing a central access control system in data communication with at least one of the access controllers and exchanging authorized resource data between the central access control system and the access controller.

31. The method of claim 30 further including the step of storing the table of authorized resources in the central access control system.

32. The method of claim 30 further including the step of providing a parallel control network that provides the authorized resource data through a third data communication medium interconnecting the central access control system and the first and second access controllers.

33. The method of claim 32 in which the first, second, and third data communication media are selected from a group consisting of: a modem, a network, a radio frequency, transmission, a SCSI bus, an IEEE-488 bus, a computer bus, an RS-232 interconnection, a cellular radio, a CATV cable, an optical fiber, a switched network, and electrical wiring.

* * * * *